US00RE38276E

(19) United States
(12) Reissued Patent
Fujimori

(10) Patent Number: US RE38,276 E
(45) Date of Reissued Patent: *Oct. 21, 2003

(54) TONE GENERATING APPARATUS FOR SOUND IMAGING

(75) Inventor: Junichi Fujimori, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/798,654

(22) Filed: Feb. 11, 1997

Related U.S. Patent Documents

Reissue of:
(64) Patent No.: 5,027,689
Issued: Jul. 2, 1991
Appl. No.: 07/401,158
Filed: Aug. 31, 1989

U.S. Applications:
(63) Continuation of application No. 08/345,531, filed on Nov. 28, 1994, now abandoned, which is a continuation of application No. 08/084,812, filed on Jun. 29, 1993, now abandoned.

(30) Foreign Application Priority Data

Sep. 2, 1988 (JP) ..... 63-220009
Sep. 2, 1988 (JP) ..... 63-220010
Sep. 2, 1988 (JP) ..... 63-220011
Sep. 2, 1988 (JP) ..... 63-220012

(51) Int. Cl.[7] ..... G10K 11/18; G10K 15/08; G10K 15/17

(52) U.S. Cl. ..... 84/622; 84/DIG. 1; 84/DIG. 27; 84/659

(58) Field of Search ..... 84/477 R, 478, 84/622, 659, DIG. 1, DIG. 27, 706, 709; 381/1; 341/31

(56) References Cited

U.S. PATENT DOCUMENTS 4,188,504 A 2/1980 Kasuga et al. ..... 179/1
4,219,696 A 8/1980 Kogure et al. ..... 179/1

(List continued on next page.)

FOREIGN PATENT DOCUMENTS

JP 4925901 3/1974
JP 5131225 3/1976

(List continued on next page.)

OTHER PUBLICATIONS

Sakamoto, Gotoh, Kogure, and Shimbo, "Controlling Sound Image Localization in Stereo Reproduction," *J. Audio Eng. Soc.*, vol. 29, Nov. 1981 at 794.

(List continued on next page.)

*Primary Examiner*—Jeffrey Donels
(74) *Attorney, Agent, or Firm*—Morrison & Foerster LLP

(57) ABSTRACT

A musical tone generating apparatus includes a position information generating device to generate musical instrument position information (PS) as plane [coordinates] *coordinate* values. This information (PS) is stored in a memory device, or selectively determined by a manual operation. The apparatus also includes an information converting device to converter information (PS) into musical tone parameter control information (PD). This control information (PD) controls musical tone source signals (S11, S12, and S13) to generate a sound field corresponding to the position of musical instruments arranged on a stage. This enables an operator to verify the musical instrument positions on a stage, thereby providing a feeling of being at a live performance.

70 Claims, 10 Drawing Sheets

U.S. PATENT DOCUMENTS

| | | | | | |
|---|---|---|---|---|---|
| 4,275,267 | A | * | 6/1981 | Kurtin et al. | 179/1 |
| 4,410,761 | A | | 10/1983 | Schickedanz | 358/335 |
| 4,577,540 | A | * | 3/1986 | Yamana | 84/381 |
| 4,648,116 | A | * | 3/1987 | Joshua | 381/18 |
| 4,731,848 | A | * | 3/1988 | Kendall et al. | |
| 4,817,149 | A | * | 3/1989 | Myers | 381/1 |
| 4,893,120 | A | * | 1/1990 | Doering et al. | 341/31 |
| 5,027,687 | A | * | 7/1991 | Iwamatsu | 84/600 |
| 5,040,220 | A | * | 8/1991 | Iwamatsu | 381/63 |
| 5,046,097 | A | * | 9/1991 | Lowe et al. | 381/17 |
| 5,105,462 | A | | 4/1992 | Lowe et al. | 381/17 |
| 5,164,840 | A | * | 11/1992 | Kawamura et al. | 381/17 X |

FOREIGN PATENT DOCUMENTS

| | | | |
|---|---|---|---|
| JP | 554012 | | 1/1980 |
| JP | 57116500 | | 1/1982 |
| JP | 57195195 | | 12/1982 |
| JP | 58-160992 | * | 9/1983 |
| JP | 59-87100 | | 6/1984 |
| JP | 59100498 | | 6/1984 |
| JP | 59-187300 | | 12/1984 |
| JP | 60-75887 | * | 4/1985 |
| JP | 61184594 | | 8/1986 |
| JP | 61257099 | | 11/1986 |
| JP | 6253100 | | 3/1987 |
| JP | 63222323 | | 9/1987 |
| JP | 62236022 | | 10/1987 |
| JP | 63-60700 | | 3/1988 |
| JP | 6348237 | | 4/1988 |
| JP | 63-98593 | | 6/1988 |

OTHER PUBLICATIONS

Sakamoto, Gotoh, Kogure, and Shimbo, "Controlling Sound Image Localization in Stereo Reproduction: Part II," *J. Audio Eng. Soc.*, vol. 30, Oct. 1982 at 719.

* cited by examiner

TONE GENERATING APPARATUS FOR SOUND IMAGING

Matter enclosed in heavy brackets [ ] appears in the original patent but forms no part of this reissue specification; matter printed in italics indicates the additions made by reissue.

*This reissue application is a continuation of reissue application Ser. No. 08/345,531, filed on Nov. 28, 1994, now abandoned, which is a continuation of reissue application Ser. No. 08/084,812, filed on Jun. 29, 1993, now abandoned, which is a reissue application of U.S. Pat. No. 5,027,689 granted Jul. 2, 1991.*

BACKGROUND OF THE INVENTION

1. Field of the Invention

The present invention relates to a musical tone generating apparatus desirable for an electronic musical instrument, an automatic musical performance apparatus, or the like, more particularly to a technique to reproduce a sound field corresponding to positions of musical instruments which are arranged on a stage of concert hall, jazz club house, or the like.

2. Prior Art

In a conventional sound effect technique, sound effect control information is preset in an apparatus so that the sound effect (e.g. reverberative effect) is desirably presented to a concert hall, jazz club house, or the like. Then, assuming that a sound effect for a specific concert hall is selected by an operator, or automatically selected, a specific sound effect is supplied of that concert hall based on the sound effect control information, by which this specific sound effect is converted to a musical tone signal.

Such conventional technique can present to some extent a desirable sound effect for listening to a performance, however, a sound field cannot be produced corresponding to respective positions of the musical instruments which are arranged on the stage of the concert hall, that is, the conventional technique cannot present a feeling of being at a live performance. In other words, the feeling given by the conventional technique is different from the feelings related to an actual sound field (related to a position of the sound image, a frequency component of the musical tone, a magnitude of the sound effect, or the like) since many types of the musical instruments are arranged at various positions on the stage of the concert hall, in case of a live performance. Accordingly, the conventional apparatus cannot present an accurate feeling of the sound field.

On the other hand, it is well known that an electronic musical instrument can have several speakers to reproduce a performance with the position of the sound image and sound effect varied by the adjustment of volume controls, switches, or the like, in which these volume controls and switches are mounted on a panel of the apparatus.

However, this is very complicated in that many select elements such as the volume controls and switches must be adjusted to reproduce a desirable feeling of the sound field, especially it is not easy to adjust a sound field based on an imagination of the position of the musical instruments as if these musical instruments are arranged on the stage of the concert hall. Up until recently, the sound effect control information has been thus preset in the apparatus to reproduce the sound effect corresponding to a stage of the concert hall, requiring a great deal of the information to be preset in the apparatus, and an apparatus of highly complicated construction.

SUMMARY OF THE INVENTION

An object of the present invention is therefore to provide a musical tone generating apparatus which can reproduce sound fields by a simple operation corresponding to musical instruments as if these musical instruments are arranged on a stage of a concert hall, or the like, so as to obtain the feeling of being at a live performance.

Another object of the present invention is to provide a musical tone generating apparatus which can readily verify each position of the musical instruments as if these musical instruments are arranged on a stage.

Another object of the present invention is to provide a musical tone generating apparatus which can provide a simple operation to reproduce the sound fields of musical instruments on respective stages.

In a first aspect of the invention, there is provided a musical tone generating apparatus comprising: a position information generating apparatus for generating musical instrument position information corresponding to positions of the musical instruments arranged on a stage of a performance place; an information converting apparatus for converting the musical instrument position information into musical tone parameter control information; a sound source apparatus for generating a musical tone source signal having a tone color corresponding to each of the musical instruments arranged on the stage; a musical tone control apparatus for controllably generating musical tone output signals corresponding to the musical tone parameter control information relative to the position of the musical instruments by receiving the musical tone source signal from the sound source apparatus; and an output apparatus for generating a musical tone from a plurality of output channels by receiving the musical tone output signal from the musical tone control apparatus so that a sound field is reproduced corresponding to the position of the musical instruments arranged on the stage.

The operator can set the position information of the musical instruments in the position information generating apparatus, even the apparent position of the musical instruments can be moved to the desired position.

The musical tone signal output can be read from a storage apparatus, or read from musical instruments.

In a second aspect of the invention, there is provided a musical tone generating apparatus comprising: a select apparatus for selecting a stage from among performance places; a storage apparatus for storing musical instrument position information which indicates a position of musical instruments arranged on a stage, and tone color indication information for indicating a tone color corresponding to each of the musical instruments; a reading apparatus for reading the musical instrument position information and the tone color indication information from the storage apparatus, in which both the musical instrument position information and the tone color indicated information are selected by the select apparatus; an information converting apparatus for converting the musical instrument position information into a musical tone parameter control information corresponding to a value of the plane coordinates and a variable which is determined by the value of the plane coordinates; a sound source apparatus for generating a musical tone source signal having a tone color corresponding to each of the musical instruments arranged on the stage; a musical tone control apparatus for controllably generating musical tone output signals in response to the musical tone parameter control information relative to the position of the musical instruments by receiving the musical tone source signal from the sound source apparatus; and an output apparatus for generating musical tone from a plurality of output channels by receiving the musical tone output signal from the musical tone control apparatus so that a sound field is reproduced corresponding to the position of the musical instruments arranged on the stage.

The musical instrument position information can be in the form of preset information corresponding to a predetermined stage as well as tone color indication information.

DESCRIPTION OF THE PREFERRED EMBODIMENT

Hereinafter, an embodiment of the present invention is described by reference to the drawings.

Figure 1:
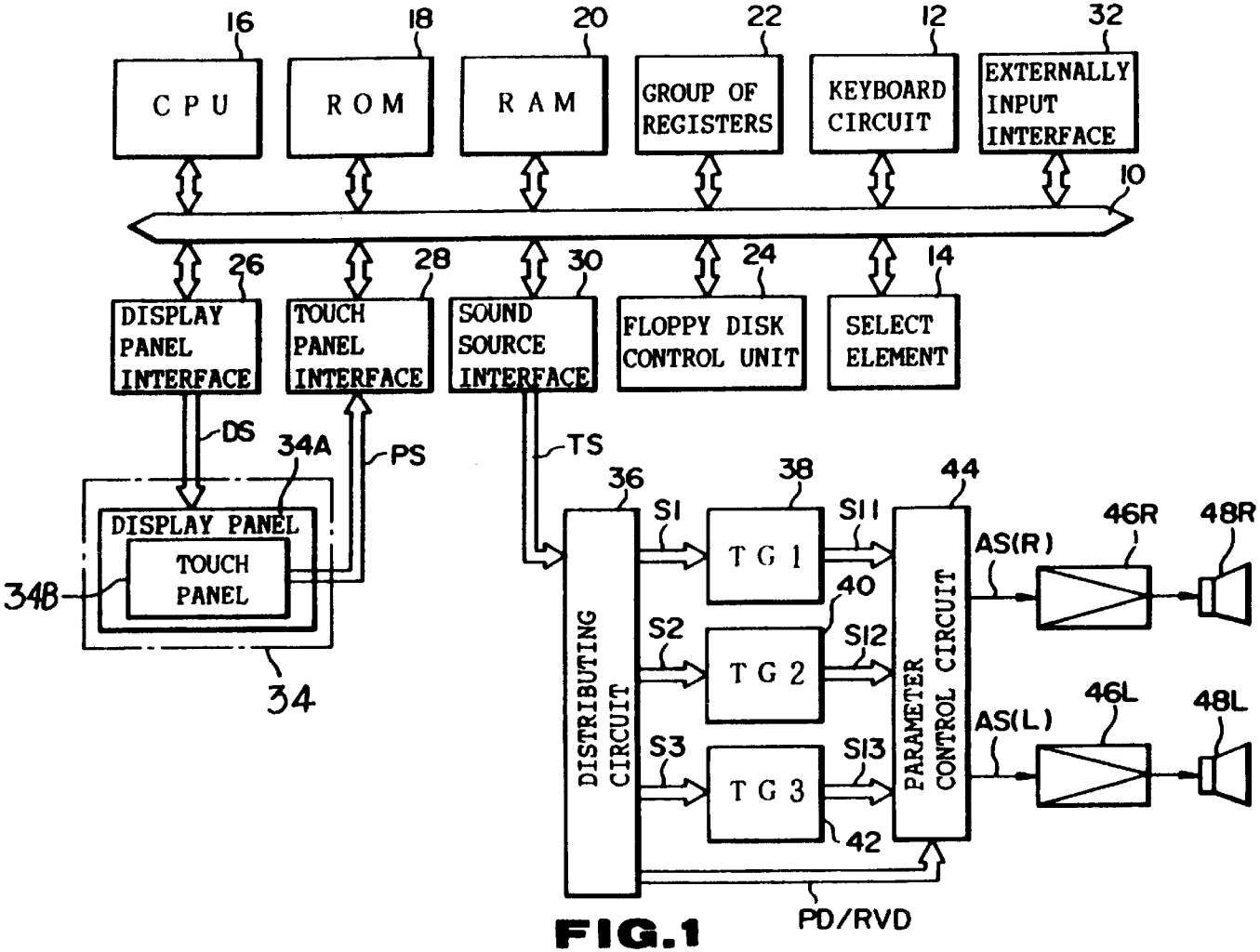
FIG. 1 is a block diagram showing the construction of a musical tone generating apparatus of an embodiment.

FIG. 1 shows a circuit diagram of an electronic musical instrument in accordance with an embodiment, in which the electronic musical instrument is controlled by a microcomputer to generate a musical tone.

In FIG. 1, major components are connected to bus 10. These components are composed of keyboard circuit 12, a group of select elements 14, CPU (central processing unit) 16, ROM (read only memory) 18, RAM (random access memory) 20, a group of registers 22, floppy disk unit 24, display panel interface 26, touch panel interface 28, sound source interface 30, and externally input interface 32.

Keyboard circuit 12 detects keyboard information corresponding to respective keys of the keyboards which are composed of an upper keyboard, a lower keyboard, and a pedal keyboard.

The group of select elements 14 comprises select elements for controlling a musical tone and for controlling a performance, and for controlling other functions, in which each select element detects the keyboard information. These select elements are described later by reference to FIG. 2.

CPU 16 executes many types of control processes to generate a musical tone in accordance with a control program stored in ROM 18. ROM 18 also stores musical tone parameter control information which is described later by reference to FIG. 5. The control processes are described later by reference to FIG. 8 to FIG. 12.

RAM 20 stores display control data which is read from floppy disk unit 24. This display control data is used for a certain stage.

The group of registers 22 is used for the control processes when CPU 16 executes the control program.

Floppy disk unit 24 is used for reading and writing the display control data from and to a floppy disk which stores many different types of display control data for use in a plurality of performance place. The details of the above are described later by reference to FIG. 4.

Display panel interface 26 and touch panel interface 28 are connected to display panel 34A and touch panel 34B, respectively, in which both display panel 34A and touch panel 34B are incorporated in musical instrument position setting device 34. Accordingly, display panel interface 26 transfers display data DS to display panel 34A, and touch panel interface 28 receives musical instrument position data PS from touch panel 34B corresponding to the touch position of the keyboard which is detected by touch panel 34B. Musical instrument position setting device 34 is described later by reference to FIG. 3.

Sound source interface 30 transfers sound source control information TS to distributing circuit 36, in which sound source control information TS is composed of key-on and key-off signals corresponding to the operation of the keyboard; performance information such as key-data (tone pitch data) corresponding to a depressed key; musical tone parameter control information PD read from ROM 18; and tone color indicated data TS and reverberation control data RVD both read from RAM 20.

Externally input interface 32 receives performance information corresponding to the operation of the keyboard, and performance information read from a memory device incorporated in the electronic musical instrument. This input performance information is supplied to distributing circuit 36 through sound source interface 30, together with a performance information from keyboard circuit 12.

Distributing circuit 36 generates first sound source control information S1, second sound source control information S2, and third sound source control information S3 depending on the type of the musical instruments indicated by sound source control information TS. The first, second, and third sound source control information S1, S2, and S3 is supplied to first sound source control circuit (TG1) 38, second sound source control circuit (TG2) 40, and third sound source control circuit (TG3) 42, respectively. In the addition, distributing circuit 36 receives musical tone parameter control information PD and reverberation control data RVD, both also being contained in sound source control information TS, and this musical tone parameter control information PD and reverberation control data RVD is directly supplied to parameter control circuit 44.

In the sound source control information described in the above, first sound source control information S1 represents tone color indication data corresponding to musical instrument 1 (e.g. piano) and performance information based on the upper keyboard in operation, second sound source control information S2 represents other tone color indication data corresponding to musical instrument 2 (e.g. violin) and performance information based on the lower keyboard, and third sound source control information S3 represents other tone color indication data corresponding to musical instrument 3 (e.g. bass) and a performance information based on the pedal keyboard.

In the above description, other performance information can be supplied from an electronic musical instrument through externally input interface 32, sound source interface 30, and distributing circuit 36, instead of the performance information input from keyboard circuit 12, based on the upper keyboard, lower keyboard, and pedal keyboard, so that various types of electronic musical instruments can be used to play an ensemble, which can even be an automatic performance ensemble.

First sound source control circuit TG1 therefore supplies digital musical tone signals S11 to parameter control circuit 44 corresponding to first sound source control information S1, second sound source control circuit TG2 supplies digital musical tone signal S12 to parameter control circuit 44 corresponding to second sound source control information S2, and similarly, third sound source control circuit TG3 supplies digital musical tone signal S13 to parameter control circuit 44 corresponding to third sound source control information S3.

Parameter control circuit 44 thus controls digital musical tone signals S11, S12, and S13 based on musical tone parameter control information PD, and generates a reverberative effect signal based on reverberation control data RVD. Parameter control circuit 44 then converts such digital musical tone signals S11, S12, and S13 into analog musical tone signals AS(R) for the right channel, and AS(L) for the left channel by a digital-analog converter incorporated in parameter control circuit 44. The details of parameter control circuit 44 are described later by reference to FIG. 6 and FIG. 7.

Musical tone signal AS(R) and musical tone signal AS(L) are supplied to right speaker 48R and left speaker 48L through amplifier 46R and amplifier 46L to generate musical tone, respectively.

Figure 2:
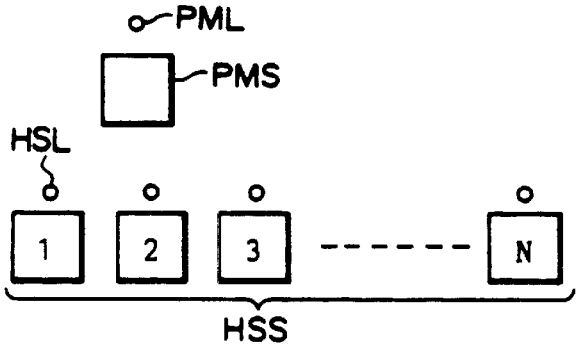
FIG. 2 is a plan view showing the lay-out of select switches.

FIG. 2 shows a lay-out of the select elements, each of which is related to this embodiment, and each of which is arranged in the group of select elements 14.

In FIG. 2, performance mode switch PMS is used for indicating a normal performance mode, that is, a manual performance (or an automatic performance) can be carried out without reproducing the sound field of the selected concert hall when it is depressed. After depression, light-emitting element PML is turned on, in which this light-emitting element PML is mounted beside performance mode switch PMS.

Hall select switch HSS comprises N switches, which are laterally arranged in the panel. Adjacent to the N switches are respective light-emitting elements HSL. Accordingly, when one of the hall select switches HSS is depressed to select a particular concert hall. A corresponding light-emitting element HSL is turned on. The manual performance (or the automatic performance) is then carried out with reproduction of a sound field for the concert hall which is selected by the hall select switch HSS.

On the other hand, when the previously depressed hall select switch HSS corresponding to the turned on light-emitting element HSL is again depressed the light-emitting element HSL is turned off, and light-emitting element PML is also turned off to terminate the manual performance.

Figure 3:
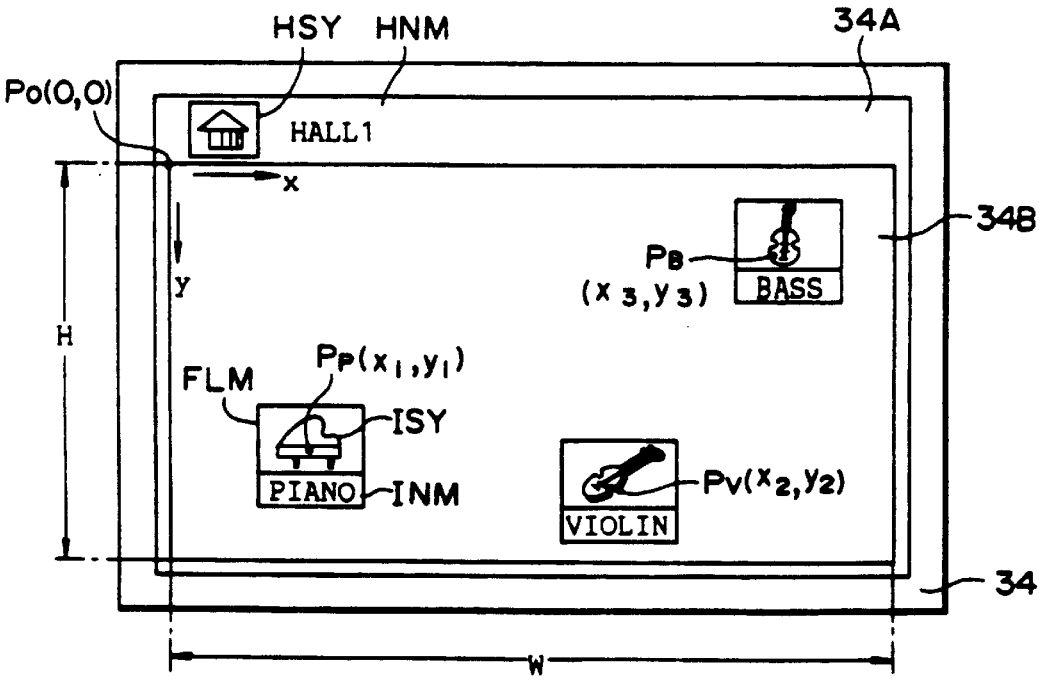
FIG. 3 is a plan view showing the lay-out of musical instruments arranged on a stage.

FIG. 3 shows a plan view of musical instrument position setting device 34 which comprises a transparent touch panel 34B having matrix-arranged switches, and display panel 34A arranged behind touch panel 34B.

Display panel 34A, for example, has a hall symbol HSY corresponding to a stage of performance place such as a concert hall, hall name HNM such as "HALL1", musical instrument display frame FLM, musical instrument symbol ISY, and musical instrument name INM. Musical instrument display frame FLM is displayed in touch panel 34B having a rectangular shape, and musical instrument symbol ISY and musical instrument name INM are displayed in each musical instrument display frame FLM. In FIG. 3, hall name HNM is displayed at the left-top corner of display panel 34A as "HALL1", musical instrument symbol ISY is displayed at the bottom-left of the display panel as "Pp" for a piano and musical instrument name INM is displayed in musical instrument display frame FLM as "piano". Similarly, a symbol "Pv" is displayed at the bottom-middle of the display panel as "violin" which is also displayed in the musical instrument display frame, and a symbol "Pb" is displayed at the top-right of the display panel as "bass" which is also displayed in the musical instrument display frame.

Touch panel 34B has rectangular coordinates which are represented by a character W corresponding to the width of the stage of a concert hall, and by a character H corresponding to the depth thereof. The origin of the coordinates ($P_0(0,0)$ is set at the top-left corner of touch panel 34B, the y axis is set in a vertical direction and the x axis is set in a horizontal direction. Accordingly, the position of the piano is indicated by $P_p(x_1, y_1)$, similarly, the position of the violin is indicated by $P_v(x_2, y_2)$, and the position of the bass is indicated by $P_b(x_3, y_3)$.

After roughly inputting the position of all musical instruments in display panel 34A, the positions can be adjusted by touching a finger within musical instrument display frame FLM in touch panel 34B corresponding to, for example, the piano position, and moving the finger to a desired position to set the piano in position. At this time, musical instrument display frame FLM, musical instrument name INM, and musical instrument symbol ISY move with the movement of the finger contact point. When the finger stops moving, the display position of the piano is finally set in touch panel 34B. Similarly, the position of the violin and bass can also be set in touch panel 34B in the same manner as described above. Thus, the position of the musical instruments can be selectively and readily arranged as if on the stage of a concert hall by touching and moving the finger over the surface of the touch panel 34B.

Figure 4:
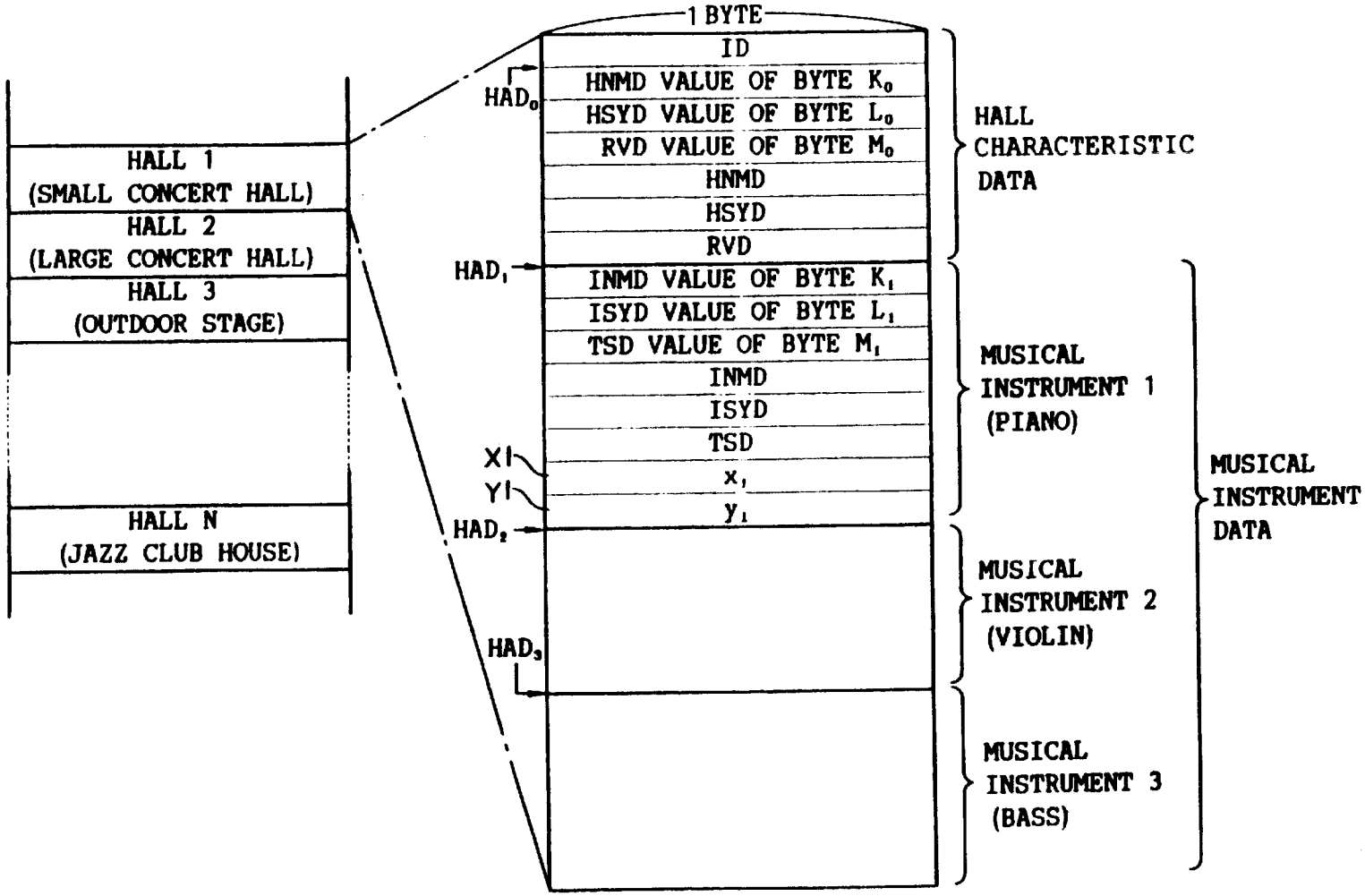
FIG. 4 is a diagram showing the control data lay-out of a memory.

FIG. 4 shows a format of display control data stored in a floppy disk. The display control data is composed of hall index data and hall data. Hall index data is composed of hall 1 (e.g. a small concert hall), hall 2 (e.g. a large concert hall), hall 3 (e.g. an outdoor stage), and hall N (e.g. a jazz club house). Hall data is composed of hall characteristic data and musical instrument data. This hall data is described later.

For example, when hall 1 is selected by one of the hall select switches HSS, floppy disk unit 24 reads the display control data from the floppy disk, and then writes it into RAM 20 with the format shown in FIG. 4.

The hall data has identification data ID followed by hall characteristic data and musical instrument data. This hall data is used for hall 1. The hall characteristic data is composed of a value of bytes $K_0$ occupied by hall name data HNMD, a value of bytes $L_0$ occupied by hall symbol data HSYD, a value of bytes $M_0$ occupied by reverberation control data RVD, as well as actual hall name data HNMD indicated by a hall name, actual hall symbol data HSYD indicated by a hall symbol, and actual reverberation control data RVD which controls the reverberative effect. A term of $HAD_0$ represents a head address of RAM 20 when the hall characteristic data is written into RAM 20. Corresponding to the head address $HAD_0$, hall name data HNMD, hall symbol data HSYD, and reverberation control data RVD are read from RAM 20 depending on the respective value of bytes occupied by the respective HNMD, HSYD, and RVD.

Musical instrument data is composed of data of musical instrument 1 (e.g. a piano), data of musical instrument 2 (e.g. a violin), and data of musical instrument 3 (e.g. a bass).

Data of musical instrument 1 is composed of data which indicates a value of bytes $K_1$ occupied by musical instrument data INMD, data which indicates a value of bytes $L_1$ occupied by musical instrument symbol data ISYD, and data which indicates a value of bytes $M_1$ occupied by tone color indicated data TSD, as well as actual musical instrument name data INMD, actual musical instrument symbol data ISYD, actual tone color indicated data which indicates a tone color (e.g. the tone color of the piano) of the musical instrument, and data which indicates the musical instrument position in the x direction ($x_1$), and data which indicates the musical instrument position in the y direction ($y_1$). A term of $HAD_1$ represents a head address of RAM 20 when the data of musical instrument 1 is written into RAM 20. Corresponding to the head address $HAD_1$, musical instrument name data INMD, musical instrument symbol data ISYD, and tone color indication data TSD are read from RAM 20 depending on the respective number of bytes occupied by the respective INMD, ISYD, and TSD data; and musical instrument position data PS ($x_1$, $y_1$) is read from RAM 20, in which X axis component $x_1$ is stored in storage area X1, and Y axis component $y_1$ is stored in storage area Y1.

While data of musical instruments 2 and 3 are handled similarly to data of musical instrument 1 described in the above, therefore details are omitted for the sake of simplicity.

With the terms $HAD_2$ and $HAD_3$ representing head addresses data of musical instruments 2 and 3 is read from RAM 20, as well as musical instrument position data ($x_2$, $y_2$) and ($x_3$, $y_3$) indicates the position of musical instruments 2 and 3, respectively. This musical instrument position data ($x_2$, $y_2$) and ($x_3$, $y_3$) is not shown in FIG. 4, but X axis components $x_2$ and $x_3$ are stored in storage area X2 and X3, and Y axis components $Y_2$ and $y_3$ are stored in storage area Y2 and Y3, respectively. These ($x_2$, $y_2$) and ($x_3$, $y_3$) components indicate musical instrument position data read from RAM 20, but not musical instrument position data PS transferred from musical instrument position setting device 34.

FIG. 5(A) to FIG. 5(D) show five types of musical tone parameter control information PD stored in respective memory portions of ROM 18.

Figure 5A:
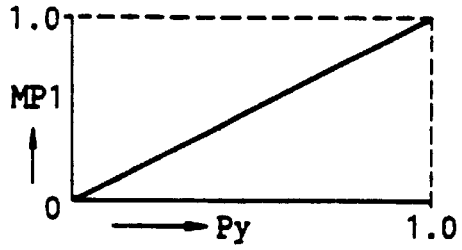
FIG. 5(A) to FIG. 5(D) are diagrams showing the information memorized in ROM 18.

One of the memory stores information as shown in FIG. 5(A). This information is composed of a normalized value $P_y$ which indicates the value of the y coordinate of a musical instrument on the stage of the hall, and a first multiplication constant MP1 which determines the position of a sound image in a y direction of the stage. The first multiplication constant MP1 is directly proportional to the normalized value $P_y$. Thus, when $P_y$=1 and MP1=1, a sound image is produced corresponding to a musical instrument positioned at the most front side of the stage.

Figure 5B:
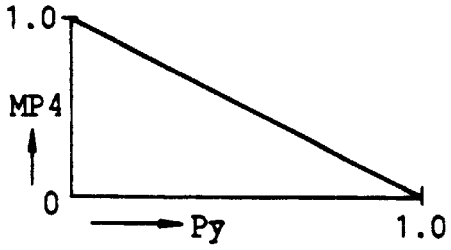

Another memory stores information as shown in FIG. 5(B). This information is composed of the normalized value $P_y$ which indicates the value of the y coordinate of a musical instrument on the stage of the hall, and a fourth multiplication constant MP4 which determines the magnitude of a reverberative effect in the y direction of the stage. The fourth multiplication constant MP4 is inversely proportional to the normalized value $P_y$. Thus, when $P_y$=0 and MP4=1, a reverberative effect can be produced corresponding to a musical instrument positioned at the most rear side of the stage.

Figure 5C:
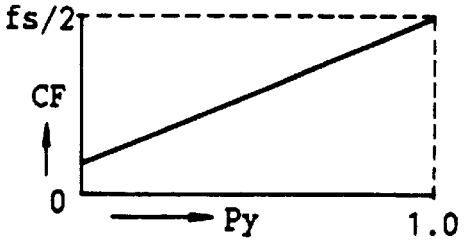

Another memory stores information as shown in FIG. 5(C). This information is composed of a normalized value $P_y$ which indicates the value of the y coordinate of a musical instrument, and a filtering constant CF which determines a cut-off frequency of a low-pass filter. The filtering constant CF is directly proportional to the normalized value $P_y$. When $P_y$=1 and CF=$f_s/2$ ($f_s$ is a sampling frequency for digital musical tone signals), a sound barrier spreads to a high tone corresponding to a musical instrument positioned at the most front side of the stage.

Figure 5D:
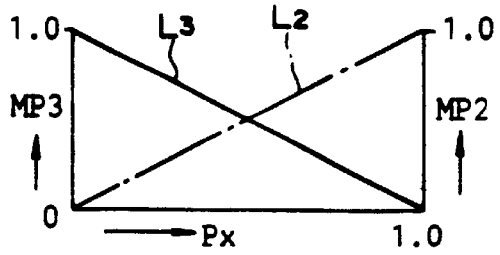

Another memory stores information as shown in FIG. 5(D). This information is composed of a normalized value $P_x$ which indicates the value of the x coordinate of a musical instrument, and second and third multiplication constants MP2 and MP3 which determine the position of a sound image in the direction to the right and left of the stage. The multiplication constant MP2 is directly proportional to the normalized value $P_x$ as shown by "$L_2$", while the multiplication constant MP3 is inversely proportional to the normalized value $P_x$ as shown by "$L_3$". Thus, when $P_x$=1, MP2=1, and MP3=0, a sound image is produced corresponding to a musical instrument which is positioned at the right most side of the stage. When $P_x$=0, MP2=0, and MP3=1, a sound image is produced corresponding to a musical instrument which is positioned at the left most side of the stage.

On the other hand, with the normalized value $P_y$ indicated by the position of a musical instrument along the y coordinate, and the normalized value $P_x$ indicated by the position of a musical instrument along the x coordinate, both of the values $P_y$ and $P_x$ are determined from the musical instrument position data (e.g. indicated by $x_1$ and $y_1$) read from RAM 20, and musical instrument position data PS transferred from musical instrument position setting device 34.

Figure 6:
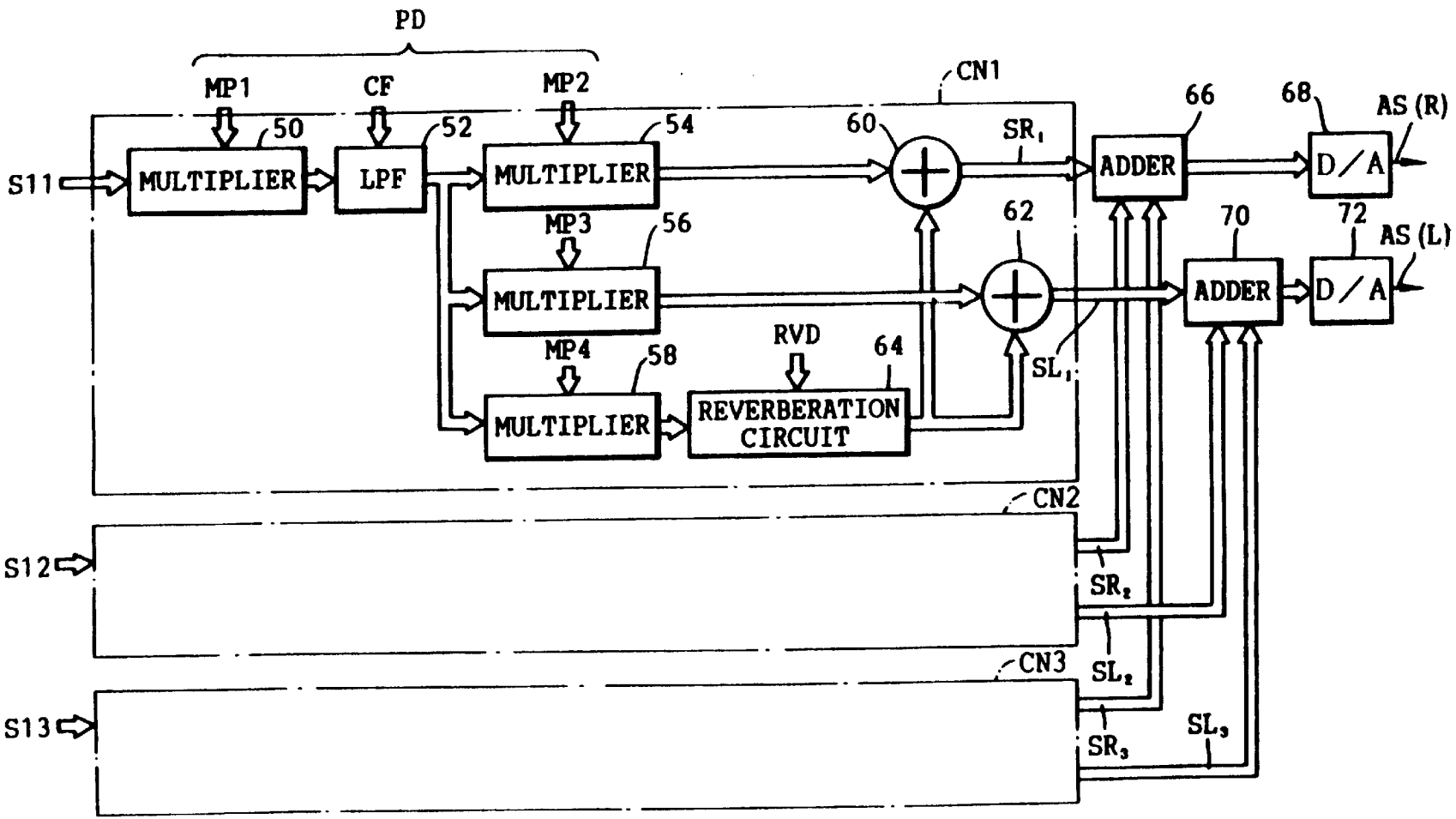
FIG. 6 is a diagram showing parameter control circuit

FIG. 6 shows parameter control circuit 4. This parameter control circuit 44 comprises three parameter controllers CN1, CN2, and CN3. These parameter controllers CN1, CN2, and CN3 receive digital musical tone signals S11, S12, and S13 from first sound source control circuit TG1, second sound source control circuit TG2, and third sound source control circuit TG3, respectively. Since parameter controllers CN1, CN2, and CN3 are identical in construction, only parameter controller CN1 is described in this embodiment.

Digital musical tone signal S11 is supplied to multiplier 50 to be multiplied by first multiplication constant MP1. A multiplication value output from multiplier 50 is supplied to low-pass filter 52 to control a frequency corresponding to filtering constant CF.

A value output from low-pass filter 52 is supplied to multiplier 54 to be multiplied by second multiplication constant MP2, then supplied to multiplier 56 to be multiplied by third multiplication constant MP3, and also supplied to multiplier 58 to be multiplied by fourth multiplication constant MP4.

Multiplied values output from multipliers 54 and 56 are supplied to adders 60 and 62, respectively, while a multiplied value output from multiplier 58 is supplied to reverberation circuit 64.

Figure 7:
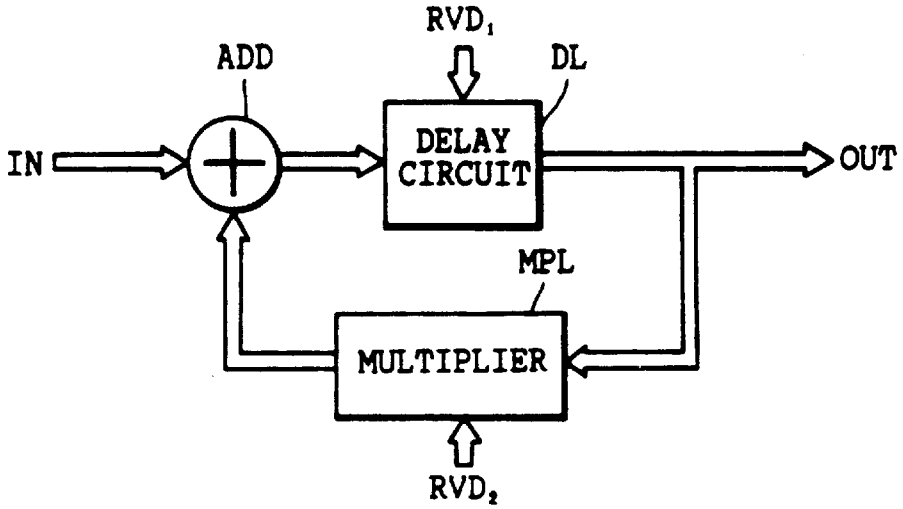
FIG. 7 is a diagram showing reverberative circuit 64.

FIG. 7 shows reverberation circuit 64. Input data IN is supplied to adder ADD, and data output from adder ADD is supplied to delay circuit DL. Data output from delay circuit DL is supplied to multiplier MPL, and then data output from multiplier MPL is supplied to adder ADD as a feedback. Delay control data $RVD_1$ which is a part of reverberation control data RVD is supplied to delay circuit DL to set a delay time, and multiplication constant data $RVD_2$ is supplied to multiplier MPL to be multiplied by the data output from delay circuit DL, so that output data OUT is output from delay circuit DL with a reverberative effect assigned.

Output data OUT is supplied to both adders 60 and 62 to be added to the data output from multipliers 54 and 56, respectively.

Data output from adder 60 is digital musical tone signal $SR_1$ for the right channel, which is supplied to adder 66. While data output from adder 62 is digital musical tone signal $SL_1$ for the left channel, which is supplied to adder 70.

Digital musical tone signals $SR_2$ and $SR_3$ for the right channel are also supplied from parameter controllers CN2 and CN3 to adder 66 to add digital musical tone signal $SR_1$. In addition, digital musical tone signals $SL_2$ and $SL_3$ for the left channel are supplied from parameter controllers CN2 and CN3 to adder 70 to add to digital musical tone signal $SL_1$.

Added data output from adder 66 is converted into analog musical tone signal AS(R) for the right channel by D-A converter 68 to output to a speaker. Added data output from adder 70 is also converted into analog musical tone signal AS(L) for the left channel by D-A converter 72 to output to a speaker.

According to FIG. 6, in multiplier 50, the sound image can be moved in the y direction of the stage shown in FIG. 3, when first multiplication constant MP1 is changed with respect to normalized value $P_y$ which indicates the y coordinate of the musical instrument as shown in FIG. 5(A).

In low-pass filter 52, the fine variation of tone color can be produced corresponding to the position of the musical instrument in the y direction of the stage, when filtering constant CF is changed with respect to normalized value $P_y$ which indicates the y coordinate of the musical instrument as shown in FIG. 5(C).

In multipliers 54 and 56, a sound image can be moved in the x direction of the stage as shown in FIG. 3, when second and third multiplication constants MP2 and MP3 are changed with respect to normalized value $P_x$ which indicates the x coordinate of the musical instrument as shown in FIG. 5(D).

In multiplier 58, the magnitude of reverberative effect can be adjusted in the y direction of the stage, when fourth multiplication constant MP4 is changed with respect to normalized value $P_y$ which indicates the y coordinate of the musical instrument as shown in FIG. 5(B).

In this embodiment, adders 60, 62, 66, and 70 electrically mix inputs with adjusted musical tone signals, and output musical tone signals to two speakers. However, several musical tones can be mixed in the air space by using several speakers, and in this case the number of adders can be reduced.

The group of registers 22 is described next for use in this embodiment.

(1) Mode register MOD: this register stores from "0" to "2", "0" for a normal performance mode, "1" for a musical instrument position setting mode, and "2" for a performance mode having a reproduction of a sound field (referred to as a reproduction performance mode in the following).

(2) Switch number register SNO: this register stores a switch number (1 to N) of hall select switch HSS when hall select switch HSS is turned on.

(3) Switch flags $SFL_1$ to $SFL_n$: these registers set "1" to a flag corresponding to a hall select switch HSS (1 to N) when hall select switch HSS is turned on.

(4) Head address registers $ADR_0$ to $ADR_3$: these registers are for storing head addresses $HAD_0$ to $HAD_3$ shown in FIG. 4.

(5) x coordinate register $P_x$: this register is for storing the normalized value $P_x$ which indicates the x coordinate.

(6) y coordinate register $P_y$: this register is for storing the normalized value $P_y$ which indicates the y coordinate.

(7) Control variable register i: this register is for storing a control variable i.

Figure 8:
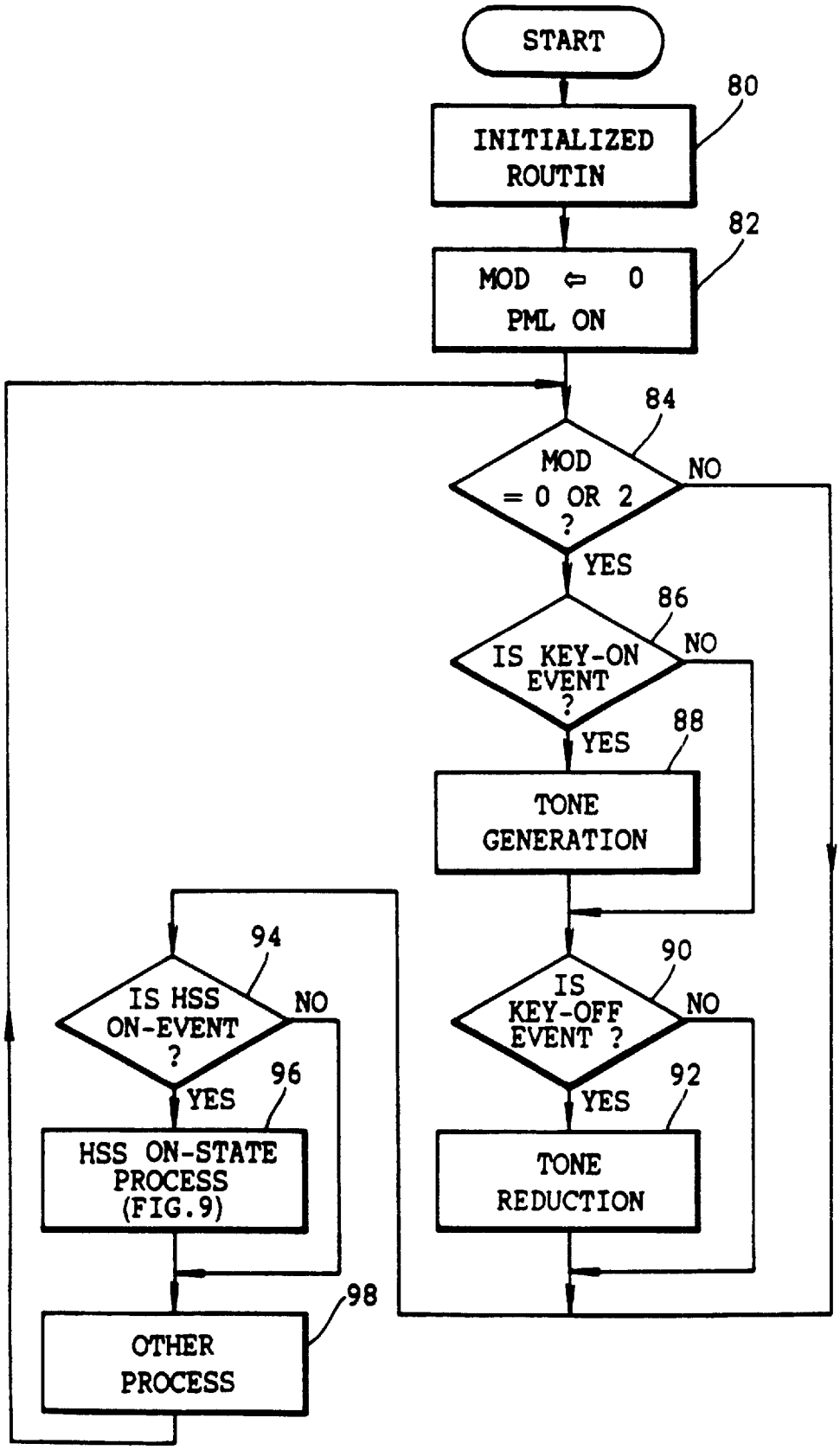
FIG. 8 is a flow chart showing a main routine of the musical tone generating apparatus.

FIG. 8 shows the flow chart of a main routine which is started by turning on a power switch.

In step 80, an initialize routine is executed to initialize each register.

In step 82, a "0" is set in mode register MOD for the normal performance mode. This makes light-emitting element PML turn on.

In step 84, the process decides whether mode register MOD is "0" or "2" (the performance mode). When this decision is "Y", the process moves to step 86, otherwise it moves to step 94.

In step 86, the process decides whether keyboard circuit 12 has a key-on event of the keyboard or not. When this decision is "Y", the process moves to step 88, other wise it moves to step 90.

In step 88, the process executes a tone generation. This is, key-on signal and key data corresponding to a depressed key are supplied to keyboard circuit 12 to generate a musical tone, then the process moves to step 90.

In step 90, the process decides whether keyboard circuit 12 has a key-off event of the keyboard or not. When this decision is "Y", the process moves to step 92, otherwise it moves to step 94.

In step 92, the process executes a reduction of sound, that is, the key-off signal and the key data for a released key are supplied to the sound source corresponding to the keyboard which made the key-off event to start reduction of the musical tone corresponding to the released key, then the process moves to step 94.

In step 94, the process decides whether hall select switch HSS has an on-event or not. When this decision is "Y", the process moves to step 96, otherwise it moves to step 98.

In step 96, a subroutine is executed for the ON-state of hall select switch HSS, then the process moves to step 98. Details of this subroutine are described later by reference to FIG. 9.

In step 98, another process is executed such as a setting process of a tone color, tone volume, and the like, then the process moves back to step 84 to repeat the processes.

Figure 9:
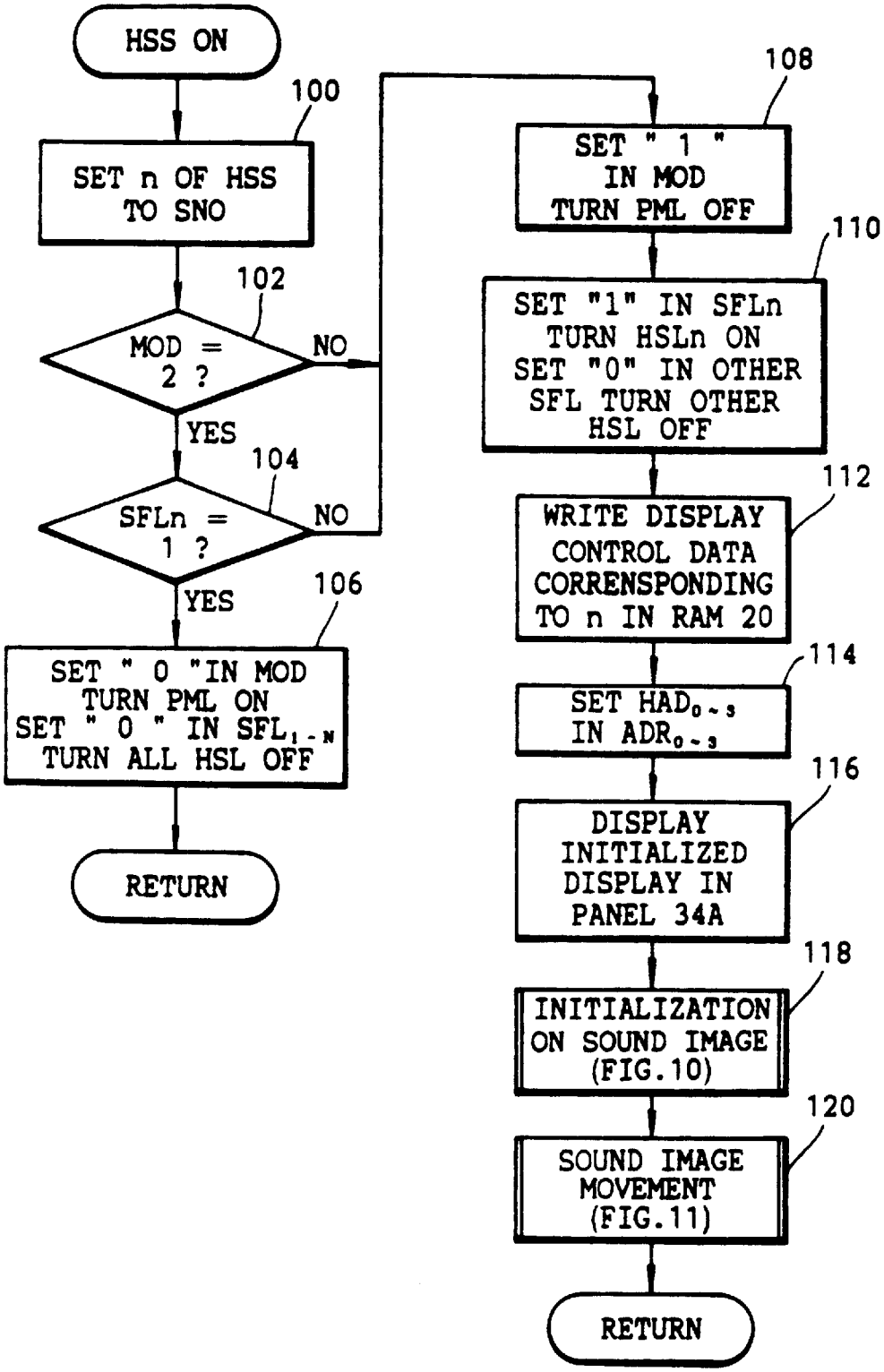
FIG. 9 is a flow chart showing a subroutine of stage select switch HSS.

FIG. 9 shows the flow chart of a subroutine when one of the hall select switches HSS is turned on.

In step 100, a number n of hall select switch HSS is set in switch number register SNO when one of hall select switch HSS is turned on, then the process moves to step 102.

In step 102, the process decides whether mode register MOD is "2" (reproducing performance mode) or not. When this decision is "Y", the process moves to step 104, otherwise it moves to step 108.

In step 104, the process decides whether switch flag $SFL_n$ is "1" (the sound field for reproduction for a stage corresponding to a value n set in switch number register SNO) or not. When this decision is "Y", the process moves to step 106, otherwise it moves to step 108.

In step 106, a "0" is set in mode register MOD, and the light-emitting element PML is turned on. A "0" is set in respective switch flags $SFL_1$ to $SFL_n$ to turn light-emitting element HSL. Afterwards, the process returns to the main routine shown in FIG. 8. In this case, the hall select switch HSS corresponding to a value is turned on, to reproduce a sound field corresponding to a value n, and the reproduction mode is canceled to return to the normal performance mode.

In step 108, a "1" is set in mode register MOD, and light-emitting element PML is turned off, then the process moves to step 110, and is changed from the normal performance mode to the musical instrument position setting mode when the process has come from step 102, and is changed from the reproducing performance mode to the musical instrument position setting mode when the process has come from step 104.

In step 110, a "1" is set in switch flag $SFL_n$ to turn light-emitting element HSL on. A "0" is also set in switch flags SFL except for switch flag $SFL_n$ to turn respective light-emitting elements HSL of, the stage is thus indicated by the light-emitting element corresponding to one of the hall select switch HSS which is turned on, then the process moves to step 112.

In step 112, a display control data for the selected stage is written into RAM 20 from the floppy disk, then the process moves to step 114.

In step 114, head addresses $HAD_0$ to $HAD_3$ are set in head address registers $ADR_0$ to $ADR_3$, then the process moves to step 116 as shown in FIG. 4.

In step 116, an initialized display is indicated in display panel 34A, then the process moves to step 118. That is, hall name data HNMD and hall symbol data HSYD are read from RAM 20, in which the data is a part of the hall characteristic data corresponding to the selected stage, then hall name HNM and hall symbol HSY are indicated in a predetermined position of display panel 34A based on that data. When hall name data HNMD is read from RAM 20, a "3" is added to head address $HAD_0$ which is set in address register $ADR_0$ to indicate the head address, and then hall name data HNMD is read depending on a value of bytes $K_0$. When hall symbol data HSYD is read from RAM 20, the value of bytes $K_0$ is added to address "$HAD_0$+3" to indicate the head address of hall symbol data HSYD, hall symbol data HSYD is therefore read depending on a value of bytes $L_0$.

After displaying hall name HNM and hall symbol HSY, musical instrument name data INMD, musical instrument symbol data ISYD, and musical instrument position data (e.g. each value of the $x_1$ and $y_1$ values) are read from RAM 20, and display data for a musical instrument is therefore formed consisting of the musical instrument name INM and musical instrument symbol ISY, both surrounded by musical instrument display frame FLM indicated in display panel 34A.

A plurality of the display data for the next two musical instruments is also formed by similar data as described in the above and indicated in display panel 34A.

Reading the musical instrument data from RAM 20 is described in the case of a musical instrument 1. The head address is indicated by adding a "3" to head address $HAD_1$ which is set in address register $ADR_1$ to read musical instrument name data INMD corresponding to the value of bytes $K_1$. This value of bytes Kis added to "$HAD_1$+3" to indicate the head address of musical instrument symbol data ISYD, then this musical instrument symbol data ISYD is read depending on the value of bytes $L_1$. Each value of the bytes $L_1$ to $M_1$ (for tone color indicated by tone color indication data TSD) is also added to an address "$HAD_1$+3+$K_1$" to indicate the head address of the musical instrument position data, then each value of the $x_1$ and $y_1$ is, in turn, read from RAM 20.

Figure 10:
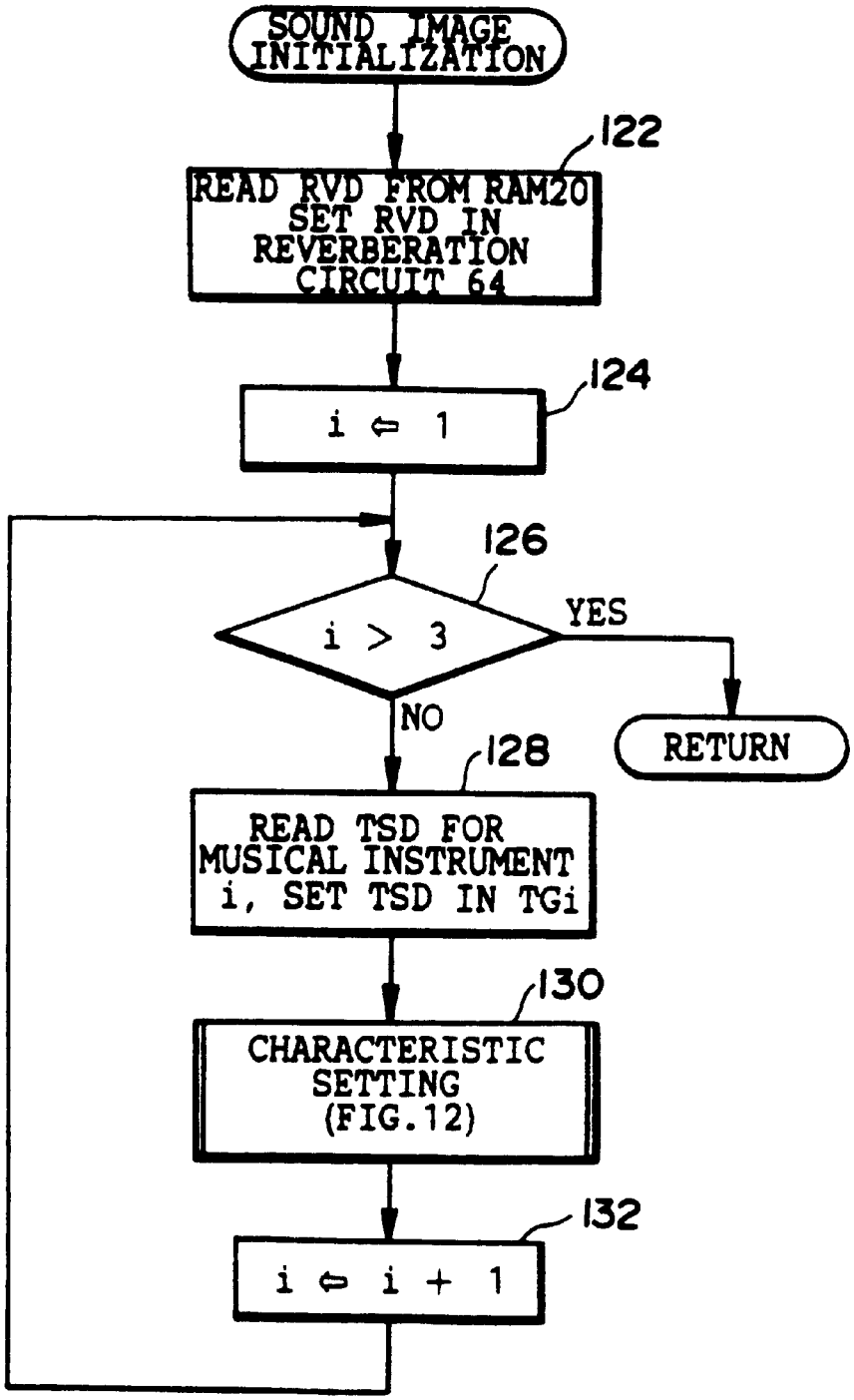
FIG. 10 is a flow chart showing a subroutine for initializing sound images.

In step 118, a sound image initialization is executed as shown in FIG. 10 which is described later.

Figure 11:
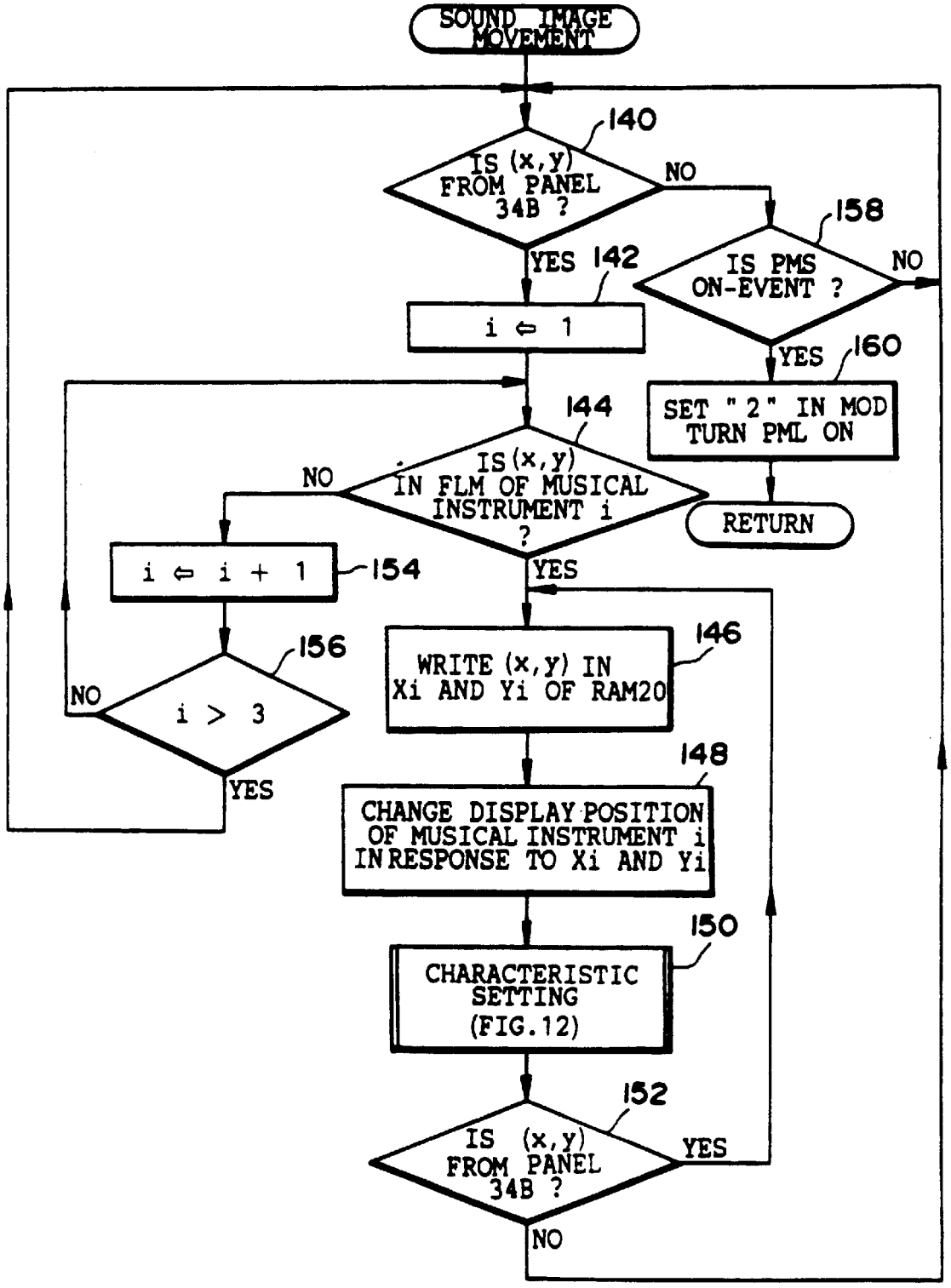
FIG. 11 is a flow chart showing a subroutine for detecting a movement of sound images.

In step 120, a sound image movement described by reference to FIG. 11 is executed, then the process returns to the main routine shown in FIG. 8.

FIG. 10 shows the sound image initialization.

In step 122, reverberation control data RVD is read from RAM 20 to set in reverberation circuit 64. When reverberation control data RVD is read from RAM 20, a value of bytes $L_0$ of hall symbol data HSYD is added to address "$HAD_0$+3+$K_0$" to indicate the head address of reverberation control data RVD, then reverberation control data RVD is read depending on the value of bytes of $M_0$, then the process moves to step 124.

In step 124, a "1" is added to control variable register i, then the process moves to step 126.

In step 126, the process decides whether the value of control variable register i is greater than "3" or not. When this decision is "N", the process moves to step 128, otherwise it returns to the subroutine shown in FIG. 9.

In step 128, tone color indicated data TSD for musical instrument i from RAM 20 is set in sound source control circuit TGi for a number i, where i is any integer. When tone color indicated data TSD is read from RAM 20, a value of bytes $L_1$ corresponding to musical instrument symbol data ISYD is added to the address "$HAD_1$+3+$K_1$" to indicate the head address of tone color indicated data TSD, then this tone color indicated data TSD is read depending on a value of bytes $M_1$, then the process moves to step 130.

Figure 12:
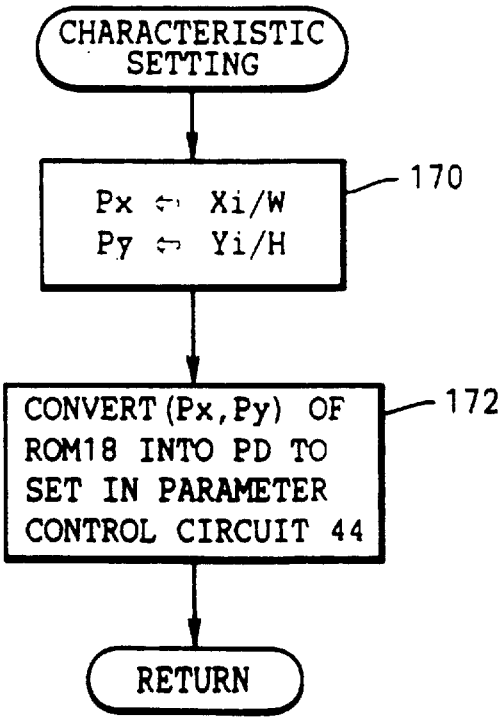
FIG. 12 is a flow chart showing a subroutine for setting a feature of the information.

In step 130, a characteristic setting of the musical instrument is executed by a subroutine which is described later by reference to FIG. 12, then the process moves to step 132.

In step 132, control variable register i is incremented by "1", then the process returns to step 126 to repeat step 126 to step 132 until control variable i is greater than "3".

When control variable i is greater than "3", the tone color setting and characteristic setting processes for the three musical instruments are terminated.

FIG. 11 shows a subroutine for the sound image movement.

In step 140, the process decides whether musical instrument position data (the x and y coordinates) is indicated in touch panel 34B, or not. When this decision is "Y", the process moves to step 142, otherwise it moves to step 158.

In step 142, a "1" is added to control variable register i, then the process moves to step 144.

In step 144, the process decides whether each of the values for the x and y coordinates is indicated within musical instrument display frame FLM or not. When this decision is "Y", then the process moves to step 146, otherwise it moves to step 154.

In step 146, each value of the x and y coordinates is written into storage area Xi and Yi of RAM 20, respectively, then the process moves to step 148.

In step 148, the display position of a musical instrument i is changed to a desired position in display panel 34A corresponding t each value of the Xi and Yi coordinates, then the process moves to step 150.

In step 150, the characteristic setting is executed by a subroutine which is described later by reference to FIG. 12, then the process moves to step 152.

In step 152, the process decides whether the musical instrument position data is indicated in touch panel 34B or not. When this decision is "Y", then the process returns to step 146 to repeat step 146 to step 152. Thus, each value of the Xi and Yi coordinates can be changed in response to a touch position of the finger while the finger keeps touching touch panel 34B and moves to another position in touch panel 34B to set a desired position of a musical instrument in display panel 34B. When the decision of step 152 is "N", the process moves to step 140 to repeat the processes described in the above.

After setting the position of musical instrument 1, if the finger then touches touch panel 34B to position musical instrument 2, the decision of step 144 is "N" so that each value of the x and y coordinates is indicated in musical instrument display frame FL of musical instrument 2. The process therefore moves to step 154.

In step 154, control variable register i is incremented by "1", then the process moves to step 156.

In step 156, the process decides whether control variable i is greater than "3" or not. When this decision is "N", the process returns to step 144.

On returning to step 144, the decision is "Y" so that each value of the x and y coordinates is indicated in musical instrument display frame FLM for musical instrument 2. The position of musical instrument 2 can then be established by executing step 146 to step 152.

Afterwards, if the finger touches touch panel 34B to position musical instrument 3, at this time, the decision of step 144 is "N" so steps 154 to 156 have to be executed twice after executing step 140 to step 142, the process moves to step 146. Thus, the position of musical instrument 3 can be established by step 146 to step 152.

In touch panel 34B, when the finger touches an area which is not a part of a musical instrument display frame FLM, the decision of step 156 is "Y", after executing step 154 three times, then the process returns to step 140.

On the other hand, when the finger does not touch panel 34B, the decision of step 140 is "N", then the process moves to step 158.

In step 158, the process decides whether performance mode switch PMS indicates an on-event or not. When this decision is "N", then the process returns to step 140, otherwise it moves to step 160.

Accordingly, if after or before setting the position at least one of three musical instruments 1 to 3, performance mode switch PMS is turned on, the decision of step 158 is then "Y", and the process moves to step 160.

In step 160, a "2" is set in mode register MOD to turn light-emitting element PML on. Thus, the performance mode is changed from the musical instrument position setting mode to the performance reproducing mode, which enables manual performance (or automatic performance) with reproduction of the sound field corresponding to the selected stage.

The musical instrument position established in steps 146 to 152 (each of the revised Xi and Yi values) can be transferred to a floppy disk driven by floppy disk unit 24. FIG. 12 shows a subroutine of the characteristic setting. In step 170, normalized value $P_x$ which is the result of dividing the value of the x coordinate stored in the storage area Xi by the length W shown in FIG. 3 is set in the storage area Px. In addition, normalized value $P_y$ which is the result of dividing the value of the y coordinate stored in storage area Yi by the length H in FIG. 3 is set in the storage area Py.

In step 172, each value of the $P_x$ and $P_y$ value (contents of Px and Py) is converted into five types of musical tone parameter control information PD (first multiplications constant MP1 to fourth multiplication constant MP4, and filtering constant CF), then a plurality of the data is set in each of parameter controllers CN1, CN2, and CN3 shown in FIG. 6.

As a result, in FIG. 10, the sound field of the selected stage is reproduced in response to the data read from RAM 20. In FIG. 11, the sound field of the selected stage is reproduced in accordance with the positions of musical instruments set by musical instrument position setting device 34.

In this embodiment, touch panel 34B is used for indicating the musical instrument position, but select elements such as a variable resister, a switch, and the like can be used instead of touch panel 34B.

Also in this embodiment, the stage is selected in combination with the musical instruments, but the stage can also be selected separately from the musical instruments.

In addition, in the case where this invention is used for an aqueous performance, the musical instrument position information can be stored in a storage area together with a plurality of performance information so that a sound image can be moved.

The preferred embodiment described herein is illustrative and restrictive; the scope of the invention is indicated by the appended claims and all variations which fall within the claims are intended to be embraced therein.

What is claimed is:

1. A musical tone generating apparatus for providing a performance effect of a plurality of musical instruments arranged in a performance place, comprising:

tone color designating means for designating a tone color corresponding to each musical instrument arranged in the performance place;

position information generating means for generating musical instrument position information corresponding to a position of each musical instrument arranged at the performance place;

*display means for displaying images of musical instruments at positions corresponding to the musical instrument position information;* information converting means for converting the musical instrument position information into musical tone parameter control information;

*musical tone generating means for generating musical tone signals;* musical tone control means for controlling *the* musical tone [parameters] *signals* in accordance with the musical tone parameter control information; and output means for outputting [a] musical tone*s* in accordance with the *controlled* musical tone [parameter outputted from the musical tone control means] *signals*.

2. A musical tone generating apparatus according to claim 1, wherein the musical instrument position information comprises a value in a plane coordinate system and a variable which is determined by the value of the plane coordinates.

3. A musical tone generating apparatus according to claim 1, wherein the information converting means comprises a CPU (central processing unit) having a control program, a ROM (read only memory), and a RAM (read access memory) to convert the musical instrument position information into the musical tone parameter control information, this musical tone parameter control information being transferred to the musical tone control means together with sound source control information.

[4. A musical tone generating apparatus according to claim 1 wherein the position information generating means comprises a display means for displaying a position of musical instruments corresponding to the musical instrument position information.]

5. A musical tone generating apparatus according to claim [4] *1* wherein the display means comprises a transparent type touch panel and a display panel arranged behind the touch panel for indicating the *respective* positions of the musical instruments.

6. A musical tone generating apparatus according to claim [1] *2*, wherein the plane coordinate system is the x and y cartesian coordinate system, and each of the musical instrument positions is indicated by x and y cartesian coordinates.

7. A musical tone generating apparatus according to claim 5, wherein [the] *a* surface of the display means includes x and y coordinates thereon.

8. A musical tone generating apparatus according to claim 5, wherein the musical tone control means comprises a parameter control circuit for generating analog musical tone signals output to [the] right and left channels.

9. [A musical tone generating apparatus according to claim 1] *A musical tone generating apparatus for providing a performance effect of a plurality of musical instruments arranged in a performance place, comprising:*

*tone color designating means for designating a tone color corresponding to each musical instrument arranged in the performance place;*

*position information generating means for generating musical instrument position information corresponding to a position of each musical instrument arranged at the performance place;*

*information converting means for converting the musical instrument position information into musical tone parameter control information;*

*musical tone control means for controlling musical tone parameters in accordance with the musical tone parameter control information; and*

*output means for outputting a musical tone in accordance with the musical tone parameter outputted from the musical tone control means, wherein the musical tone control means comprises a low pass filter and* wherein the musical tone parameter control information comprises:

a first multiplication constant MP1 which is directly proportional to a normalized value $P_y$, in which the normalized value $P_y$ indicates a position of [the] *a* y coordinate in the stage, and the first multiplication constant MP1 determines a position in a y direction of the stage;

[a fourth multiplication constant MP4 which is inversely proportional to the normalized value $P_y$, in which the fourth multiplication constant MP4 determines a magnitude of a reverberative effect in the y direction of the stage;]

a filtering constant CF which is directly proportional to a normalized value of $P_y$, in which the filtering constant CF determines a cut-off frequency of [a] *the* low-pass filter; [and]

a second multiplication constant MP2 which is directly proportional to a normalized value $P_x$ and a third multiplication constant MP3 which is inversely proportional to the normalized value $P_x$, in which the second and third multiplication constants MP2 and MP3 determine the position of a sound image in [the right and left directions] *an x direction* of the stage, and the normalized value of $P_x$ indicates the position of [the] *an* x coordinate of the stage[;] *and*

*a fourth multiplication constant MP4 which is inversely proportional to the normalized value $P_y$, in which the fourth multiplication constant MP4 determines a magnitude of a reverberative effect in the y direction of the stage.*

10. A musical tone generating apparatus comprising:

select means for selecting a stage among performance places;

storage means for storing musical instrument position information which indicates the position of a musical instrument arranged on the stage, and the tone color corresponding to the musical instrument;

reading means for reading the musical instrument position information and the tone color from the storage means, in which both the musical instrument position information and the tone color are selected by the select means;

*display means for displaying images of musical instruments at positions corresponding to the musical instrument position information;* information converting means for converting the musical instrument position information into musical tone parameter control information in response to a value of the plane coordinates and a variable which is determined by the value of the plane coordinates;

musical tone control means for controlling musical tone parameters in accordance with the musical tone parameter control information; and output means for outputting a musical tone in accordance with the musical tone parameter outputted from the musical tone control means.

11. A musical tone generating apparatus according to claim 10, wherein the select means comprises select elements having variable resistors.

12. A musical tone generating apparatus according to claim 10, wherein the storage means comprises a ROM.

13. A musical tone generating apparatus according to claim 10, wherein the reading means is controlled by a computer program stored in a CPU (central processing unit) to read the musical instrument position information and the tone color from the storage means.

14. A musical tone generating apparatus according to claim 10, wherein the select means comprises select elements having variable switches.

15. A musical tone generating apparatus according to claim 10, wherein the storage means comprises a floppy disk.

*16. A sound processing apparatus for moving a visual image position and a sound image position together, the sound processing apparatus comprising:*

*display means for displaying a visual image representing a sound source;*

*sound generating means including a tone generator and a plurality of loudspeakers for generating a sound corresponding to the sound source;*

*position information generating means for generating sound source position information;*

*control means for controlling the display means based on the position information so that the display means displays the visual image at a visual image position corresponding to the position information and for controlling the sound generating means based on the position information so that a sound image of the sound*

*generated by the sound generating means is produced at a sound image position corresponding to the position information,*

*wherein the visual image position and the sound image position are updated in response to changes in the position information.*

*17. A sound processing apparatus according to claim 16, wherein the sound source is a musical instrument having a given tone color.*

*18. A sound processing apparatus according to claim 16, wherein the position information generating means generates data representing a x-y position in a plane coordinate system as the position information.*

*19. A sound processing apparatus according to claim 18, wherein the position information generating means includes a transparent touch panel disposed in front of the display means, and the x-y position is designated on the touch panel by a performer at the position of the visual image.*

*20. A sound processing apparatus according to claim 16, wherein the position information generating means includes a variable resistor and the position information is designated with the variable resistor by a performer.*

*21. A sound processing apparatus according to claim 16, further comprising:*

*reverberation effect imparting means for imparting a reverberation effect, based on the position information, to the sound generated by the sound generating means to impart a sound image effect to the sound generated.*

*22. A sound processing apparatus according to claim 21, wherein the reverberation effect imparting means controls the amount of the reverberation effect to be imparted in response to the position information.*

*23. A sound processing apparatus according to claim 21, wherein the sound generating means generates a sound corresponding to data input through an external interface.*

*24. A sound processing apparatus according to claim 16, further comprising:*

*sound modification means for modifying the sound generated by the sound generating means based on the position information so that the sound generating means generates the sound modified in response to the position information, wherein the sound modification means modifies a sound image effect in response to the position information.*

*25. A sound processing apparatus according to claim 24, wherein the sound modification means includes a low pass filter.*

*26. A sound processing apparatus according to claim 25, wherein the sound modification means controls the cut-off frequency of the low pass filter in response to the position information.*

*27. A sound processing apparatus for generating a sound, the sound processing apparatus comprising:*

*a display for displaying a visual image representing a sound source located in an image space;*

*sound generating means including a tone generator for generating a sound corresponding to a sound characteristic of the sound source;*

*position information generating means for generating sound source position information representing a desired display position;*

*storage means for storing conversion characteristics;*

*information converting means for converting the position information to sound parameters in accordance with the conversion characteristics stored in the storage means; and*

*control means for controlling the display based on the position information so that the display displays the visual image at a visual image position corresponding to the position information, and for controlling the sound generating means based on the converted sound parameters so that a sound image of the sound signals generated by the sound generating means is produced at a sound source position corresponding to the position information.*

*28. A sound processing apparatus for generating a sound, the sound processing apparatus comprising:*

*sound generating means including a tone generator for generating a sound corresponding to a sound characteristic of the sound source;*

*storage means for storing sound source position information;*

*reading means for reading the sound source position information from the storage means;*

*control means for controlling the tone generator based on the sound source position information so that a sound image of the sound signals generated by the tone generator is produced at a position corresponding to the sound source position information; and*

*a display for displaying a visual image corresponding to the sound source in an image space, wherein the control means controls the display so that the display displays the visual image at a position corresponding to the sound source position information.*

*29. A sound processing apparatus according to claim 28, wherein the storage means comprises a floppy disk which stores the sound source position information.*

*30. A sound processing apparatus according to claim 22, wherein the storage means further stores symbol information representing visual images to be displayed, and the display means displays a visual image based on the symbol information.*

*31. A sound processing apparatus according to claim 22, wherein the visual image has a shape of a corresponding sound source.*

*32. A sound processing apparatus according to claim 28, further comprising:*

*position information generating means for generating position information in response to a player's operation, wherein the sound source position information is changed based on the generated position information, and the sound generating means and the display are controlled based on the changed sound source position information.*

*33. A sound processing apparatus for generating a sound, the sound processing apparatus comprising:*

*sound generating means including a tone generator for generating a sound corresponding to a sound characteristic of a sound source;*

*a display for displaying a visual image corresponding to a sound source in an image space;*

*storage means for storing sound source position information;*

*reading means for reading the sound source position information from the storage means;*

*control means for controlling the sound generating means based on the sound source position information so that a sound image of the sound generated by the sound generating means is produced at a position corresponding to the sound source position information; and*

*position information generating means for generating position information in response to a player's*

*operation, wherein the sound source position information is changed based on the generated position information, and the control means controls the sound generating means and the display means based on the changed sound source position information.*

*34. A sound processing apparatus according to claim 33, wherein the position information generating means generates data representing a x-y position in a plane coordinate system as the position information.*

*35. A sound processing apparatus according to claim 34, wherein the position information generating means includes a transparent touch panel disposed on the display means, and the x-y position is designated on the touch panel by a performer.*

*36. A sound processing apparatus according to claim 34, wherein the position information generating means includes a variable resistor, wherein the x-y position is responsive to changes in the variable resistor.*

*37. A sound processing apparatus for generating a sound, processing apparatus comprising:*

*a sound generator including a tone generator and speakers generating a sound corresponding to a sound characteristic of a sound source;*

*an external memory device which stores sound source position information;*

*a reading circuit which reads the sound source position information from the external memory device and which causes the sound source position information to be stored within a local memory;*

*a controller coupled to the sound generator and responsive to the sound source position information, wherein the controller controls a position of a sound image of the second generated by the sound generator in response to the sound source position information;*

*a display for displaying a visual image corresponding to a sound source located in an image space; and*

*a position information generator which generates position information in response to a player's operation, wherein the sound source position information is changed based on the generated position information, and the controller controls the sound generator based on the changed sound source position information.*

*38. A sound processing apparatus according to claim 37, wherein the external memory device is a floppy disk and the reading circuit is a floppy disk control unit.*

*39. A sound processing apparatus according to claim 37, further comprising:*

*a display which displays a visual image corresponding to a sound source located in an image space;*

*wherein the controller is responsive to the sound source position information so that the visual image appears at a position corresponding to the sound source position information.*

*40. A sound processing apparatus according to claim 39, wherein the external memory device stores symbol information representing visual images to be displayed, and the visual image is displayed based on the symbol information read out by the reading out means.*

*41. A method of moving a visual image position and a sound image position simultaneously, the method comprising the steps of:*

*displaying a visual image representing a sound source located in an image space on a display;*

*generating a sound corresponding to a sound source;*

*generating position information in response to player control;*

*controlling the display based on the position information so that the display produces a visual image corresponding to a sound source at a visual position corresponding to the position information; and*

*controlling a sound generator which includes a tone generator and speakers based on the position information so that the sound generator produces a sound image corresponding to the sound source at a sound image position corresponding to the position information;*

*wherein the visual image position and the sound image position are updated in response to changes in the position information.*

*42. A method of sound processing comprising the steps of:*

*displaying a visual image representing a sound source located in an image space on a display;*

*generating sounds with a tone generator which corresponds to the sound source;*

*reading conversion characteristics from a storage device;*

*generating sound source position information corresponding to a desired display position;*

*converting the position information to sound parameters in accordance with the characteristics read from the storage device;*

*controlling the display based upon the position information so that the display displays the visual image at a visual image position corresponding to the position information; and*

*controlling the tone generator based on the converted sound parameters so that the tone generator produces a sound image at a sound source position corresponding to the position information.*

*43. A method of sound processing comprising the steps of:*

*generating a sound signal in response to a designation and generating a sound based upon the sound signal corresponding to a sound characteristic of a sound source;*

*storing sound source position information into an external storage;*

*reading out the sound source position information from the external storage so that the sound source position information is stored within a local memory;*

*controlling a sound generator which includes a tone generator and speakers in accordance with the locally stored sound source position information so that the sound generator generates a sound at a sound image position corresponding to the sound source position information; and*

*displaying a visual image representing a sound source located in an image space on a display;*

*generating position information in response to a player's operation and changing the sound source position information based on the generated position information, and wherein said controlling step controls the sound generator based on the changed sound source position information.*

*44. A method of sound processing according to claim 43, the method further comprising the steps of:*

*controlling a display in accordance with the sound source position information so that a visual image displayed by the display is provided at a position corresponding to the sound source position information.*

*45. A method of sound processing according to claim 44, the method further comprising the step of:*

*storing symbol information representing visual images to be displayed into the external storage,*

*wherein the visual image is displayed based on the symbol information.*

*46. A sound apparatus for moving a visual image position and a sound image position together, the sound processing apparatus comprising:*

*a display that displays a visual image corresponding to a sound source located in an image space;*

*a sound generator having a tone generator and plurality of loudspeakers for generating a sound corresponding to the sound source;*

*a position information generator that generates position information;*

*a controller that controls the display based on the position information so that the display displays the visual image at a visual position corresponding to the position information and for controlling the sound generator based on the position information so that a sound image of the sound generated by the sound generator is produced at a sound position corresponding to the position information;*

*wherein the visual image and the sound image are moved together in response to changes in the position information.*

*47. A sound processing apparatus according to claim 46, further comprising:*

*a reverberation effect imparting circuit that imparts a reverberation effect, based on the position information, to the sound generated by the sound generator.*

*48. A sound processing apparatus according to claim 46, further comprising*

*a sound modifier that modifies the sound generated by the sound generator based on the position information so that the sound generator generates the sound modified in response to the position information.*

*49. A sound processing apparatus according to claim 46, wherein the sound source is a musical instrument having a given tone color.*

*50. A sound processing apparatus according to claim 46 wherein the position information generator generates data representing a x-y position in a plane coordinate system as the position information.*

*51. A sound processing apparatus according to claim 50, wherein the position information generator includes a transparent touch panel disposed in front of the display, and the x-y position is designated on the touch panel by a performer at the position of the visual image.*

*52. A sound processing apparatus according to claim 46, wherein the position information generator includes a variable resistor and the position information is designated with the variable resistor by a performer.*

*53. A sound processing apparatus comprising:*

*a sound generator including a tone generator and speakers that generates a sound corresponding to a sound source;*

*a display that displays a visual image corresponding to a sound source located in an image space;*

*a position information generator that generates sound source position information corresponding to display position;*

*a storage medium that stores conversion characteristics;*

*an information converter that converts the position information to sound parameters in accordance with the conversion characteristics stored in the storage medium; and*

*a sound image position controller that controls the sound generator based on the converted sound parameters so that the sound image of the sound generated by the sound generator is produced at a sound source position corresponding to the position information.*

*54. A sound processing apparatus comprising:*

*a sound generator including a tone generator and speakers that generates a sound corresponding to a sound characteristic of a sound source;*

*a storage means that stores sound source position information;*

*a reader that reads the sound source position information from the storage medium;*

*a controller that controls the sound generator based on the sound source position information so that the sound image of the sound generated by the second generator is produced at a position corresponding to the sound source position information; and*

*a display that displays a visual image corresponding to the sound source, wherein the controller controls the display to display the visual image at a position corresponding to the sound source position information.*

*55. A sound processing apparatus comprising:*

*a sound generator including a tone generator driving a plurality of loudspeakers with a sound signal;*

*an external memory device which stores sound source position information;*

*a reading circuit which reads the sound source position information from the external memory device;*

*a controller coupled to the sound generator and responsive to the sound source position information, wherein the controller alters the position of the sound image generated by the sound generator in response to changes in the sound source position information; and*

*a display that displays a visual image corresponding to a sound source located in an image space.*

*56. A method of sound processing comprising the steps of:*

*generating a sound corresponding to a sound characteristic of a sound source;*

*storing sound source position information;*

*reading out the stored sound source position information;*

*controlling a sound generator which includes a tone generator and speakers in accordance with the sound position information so that the sound generator produces a sound image at a position corresponding to the sound source position information; and*

*displaying a visual image corresponding to the sound source, wherein said controlling step causes the displaying step to display the visual image at a position corresponding to the sound source position information.*

*57. A processing apparatus comprising:*

*a display that displays a visual image corresponding to a sound source located in an image space;*

*a sound generator having a tone generator and a plurality of loudspeakers for generating a sound corresponding to the sound source;*

*a position information generator that generates position information; and*

*a controller that controls the display based on the position information so that the display displays the visual image at a visual position corresponding to the position information and controls the sound generator based on the position information so that a sound image of the*

*sound generated by the sound generator is produced at a sound position corresponding to the visual position.*

*58. A sound processing apparatus according to claim 57, further comprising:*

*a converter that converts the position information into the sound parameter information.*

*59. Sound processing apparatus comprising:*

*a designating device that designates a plurality of sound sources;*

*a display that displays a plurality of visual images, located in an image space, each of which represents one of the plurality sound sources;*

*a sound generator including a tone generator and a plurality of loudspeakers that generates a plurality of sounds each of which corresponds to one of the plurality of sound sources;*

*a position information generator that generates position information for each of the plurality of sound sources; and*

*a controller that controls the display based on the position information so that the display displays the plurality of visual images at visual positions corresponding to the position information and that controls the sound generator based on the position information so that sound images of the sounds generated by the sound generator are produced at sound positions corresponding to the position information.*

*60. Sound processing apparatus comprising:*

*a display having a display panel that displays a plurality of visual images, located in an image space, each of which has a shape representing one of a plurality of sound sources;*

*a sound generator including a tone generator and a plurality of loudspeakers that generates a plurality of sounds each of which corresponds to one of the plurality of sound sources;*

*a device with which a player provides a moving operation input for each of the plurality of sound sources; and*

*a controller that controls the display so that the display moves the plurality of visual images in response to the moving operation and that controls the sound generator so that sound images of the sounds generated by the sound generator are moved in response to the moving operation.*

*61. Sound processing apparatus comprising:*

*a selecting device that selects a performance space;*

*sound generator including a tone generator that generates a sound;*

*an acoustic effector that imparts to the sound an acoustic effect corresponding to the selected performance space;*

*a display;*

*a controller that controls the display so that the display displays a visual image representing the selected performance space.*

*62. Sound processing apparatus according to claim 61, wherein the display is controlled to display a name of the selected performance space.*

*63. Sound processing apparatus according to claim 61, wherein the sound generator simultaneously generates a plurality of sounds having a plurality of tone colors, and the display is controlled to display a plurality of visual images representing the plurality of tone colors.*

*64. Sound processing apparatus according to claim 63, wherein the display is controlled to display names of the plurality of tone colors.*

*65. Sound processing apparatus according to claim 63, wherein the acoustic effector imparts a reverberative effect to the sound as acoustic effect.*

*66. Sound processing apparatus according to claim 63, wherein the acoustic effector imparts to the sound an effect, in which a sound image of the sound is produced at a desired position, as the acoustic effect.*

*67. Sound processing apparatus according to claim 66, wherein the acoustic effector is controlled by the controller to move the position of the sound image.*

*68. Sound processing apparatus comprising:*

*a storage medium that stores a set of sound information and acoustic effect information for each of a plurality of performance spaces;*

*a selecting device that selects one of the plurality of performance spaces;*

*a display which displays information about the selected performance space and/or sound;*

*a sound generator including a tone generator that generates a sound based on the sound information which corresponds to the selected performance space and is read out from the storage medium; and*

*an acoustic effector that imparts an acoustic effect to the sound based on the acoustic effect information which corresponds to the selected performance space and is read out from the storage medium.*

*69. Sound processing apparatus according to claim 68, wherein the storage medium stores reverberative information as the acoustic effect information, and the acoustic effector imparts a reverberation to the sound based on the reverberative information.*

*70. Sound processing apparatus according to claim 68, wherein the storage medium stores position information as the acoustic effect information, and the acoustic effector imparts to the sound an effect in which a sound image of the sound is produced at a position corresponding to the position information read out as the acoustic effect information.*

*71. Sound processing apparatus according to claim 70, wherein the apparatus further comprises a position designating device which designates a desirable position in response to a player's operation, and, when one of the plurality of performance spaces is selected by the selecting device, the sound image of the sound is produced at a position corresponding to the position information which corresponds to the selected performance space, and, when the desired position is designated by the position designating device, the sound image of the sound is produced at a position corresponding to the desired position.*

* * * * *